3,285,733
SLOW RELEASE FERTILIZER COMPRISING UREA, WAX, AND NATURAL RESIN
James E. Hess, Springfield, Pa., assignor to Sun Oil Company, Philadelphia, Pa., a corporation of New Jersey
No Drawing. Filed Dec. 13, 1963, Ser. No. 330,229
11 Claims. (Cl. 71—64)

This invention relates in one aspect to a method of forming a stable dispersion of urea in molten paraffin wax. The dispersion is stable in that the urea does not react with the molten paraffin wax to form an adduct. This reaction is prevented and stability thus imparted to the dispersion, by incorporating into the paraffin wax a relatively small amount of a natural resin selected from the group consisting of damar resins, East India resins, copal resins, elemi resin, and mastic resin. The invention relates in another aspect to slow release fertilizer compositions. The compositions of the invention have an unusually and unexpectedly high resistance to water and comprise a dispersion of urea in paraffin and/or microcrystalline wax, the wax having dissolved therein an East India resin.

Nitrogen, potassium, and phosphorus are essential elements for plant growth and commercially available fertilizers invariably contain one or more of these elements. Examples of those in frequent use at the present time include urea, ammonium nitrate, ammonium sulfate, potassium chloride, sodium nitrate, potassium sulfate, monoammonium phosphate, diammonium phosphate, calcium cyanamide, potassium nitrate, potassium phosphate, superphosphate (a mixture of calcium acid phosphate and calcium sulfate), and triple superphosphate (calcium acid phosphate). Urea is a preferred source of nitrogen because it contains a higher percentage of nitrogen than most of the other nitrogen fertilizer compounds presently in use. Most commercially available fertilizers are either a nitrogen fertilizer, i.e., they contain only a source of nitrogen, or are complete fertilizers in which case they contain a source of all three essential elements, i.e., nitrogen, phosphorus, and potassium.

Unfortunately, most of the commercial fertilizers mentioned previously are readily water soluble and this creates a number of disadvantages. In a heavy rainfall much of the fertilizer may be dissolved in the rainwater and soaked into the ground below the plant roots or rapidly transported away by flowing surface water. This fertilizer never becomes available to the plants. Another disadvantage is that the fertilizer often becomes available to the plant too rapidly resulting in injury to the plant rather then benefit. This is often noticed in "burned" lawns, crops, etc.

One method of reducing the rate at which the fertilizer is consumed is to mix the fertilizer, which can be a single compound as in the case of a nitrogen fertilizer or a blend of several compounds as in the case of a complete fertilizer, and molten wax, i.e., disperse the fertilizer in molten wax, form the dispersion into small particles in a mold and allow the particles to cool below the melting point of the wax. The resulting particles are a dispersion of solid fertilizer particles in solid wax. Each particle of fertilizer is substantially completely surrounded by and encased in wax. They can also be described as a slow release fertilizer because the water resistance of the dispersed fertilizer is higher than the water resistance of the fertilizer compound alone. A quantitative determination of water resistance, i.e., release rate, can be made by submerging a known amount of the slow release fertilizer in water at room temperature (i.e., 25° C.) and without agitation and thereafter determining at various time intervals the amount of fertilizer ingredient which has dissolved in the water. The water resistance of the fertilizer can be varied, by varying the amount of wax in the dispersion, so as to provide the proper rate of release of the fertilizer for the particular climatic conditions encountered. In areas of relatively heavy rainfall the water resistance of the fertilizer should normally be relatively high and the amount of wax in the dispersion should be relatively high. Conversely, in relatively dry areas the water resistance should be relatively low and the amount of wax in the dispersion should be relatively low.

Although any kind of wax can be used to form a slow release fertilizer, paraffin wax and microcrystalline wax are preferred because they are generally less costly than other waxes such as ozocerite wax, etc. In addition, paraffin wax is often less expensive than microcrystalline wax; hence between these two, the former is preferred.

It has already been mentioned that urea is a preferred source of nitrogen. However, in preparing a slow release urea-wax fertilizer certain difficulties are encountered. One, the water resistance of the fertilizer composition may not be high enough to permit use of the fertilizer in areas of heavy rainfall. This difficulty may arise irrespective of whether the wax component of the fertilizer is paraffin wax or microcrystalline wax. A method of improving the water resistance of a wax-urea slow release fertilizer is therefore desirable.

A second difficulty arises when the wax is paraffin wax and, in addition, arises in the preparation of the urea-paraffin wax fertilizer as opposed to the first mentioned difficulty above which is a disadvantage of the composition itself. When urea and molten paraffin wax are initially mixed, nothing unusual occurs. Shortly after mixing, however, a white precipitate forms. If the ratio of urea to paraffin wax is higher than about 1:1 the entire mass becomes a solid having about the texture of wet sand. In this case it is extremely difficult to even remove the solid mass from the mixing vessel. The precipitate is not merely a physical mixture of wax and urea because when the precipitate is separated and heated to 210° F. the wax component thereof, which has a melting point of 129° F., does not melt. Analysis of the precipitate indicates that it is a urea-paraffin wax adduct having a composition of about 76% urea-24% paraffin wax. The time required for adduction, i.e., the formation of the precipitate, varies somewhat but appears to depend mainly upon urea particle size. When commercial crystal urea, which has a particle size of mainly larger than 100 mesh (all mesh sizes are by U.S. Standard Sieves) is used adduction often occurs in less than 15 minutes. When urea having a particle size of 100% through 200 mesh is used adduction often occurs in less than 5 minutes. In any event the reaction often occurs before the dispersion of urea in paraffin wax can be shaped into small particles.

The solid adduct itself has some slow release properties and has been disclosed and claimed in a copending application of Bozzelli et al., Serial No. 308,087, filed September 11, 1963, in which application it is disclosed that the water resistance of a urea-paraffin wax adduct is higher than the water resistance of a dispersion of urea in paraffin wax containing the same total amounts of urea and paraffin wax but in which the urea is in the unadducted form. Unfortunately, it has been found that the water resistance of the urea-paraffin wax adduct composition sometimes decreases rapidly after prolonged contact of the composition with water. This behavior is unpredictable since some batches of adduct exhibit it while other, apparently identical, batches do not. Because of this erratic behavior it is often desirable that the slow release fertilizer be a dispersion of urea in paraffin wax rather than a urea-paraffin wax adduct. Where such is the case a method of preventing or at least postponing the adduction reaction is necessary in order that such reaction does not occur during the time the dispersion is being processed into small particles.

I have now found solutions to the two difficulties mentioned above. More specifically I have found materials which when incorporated into molten paraffin wax prevent or at least substantially delay adduction of urea when the latter is mixed therewith. Furthermore, I have also found that the water resistance of a slow release urea-paraffin wax fertilizer or a urea-microcrystalline wax fertilizer is substantially improved by incorporating some of these same materials into the wax. This improvement in water resistance is unusually high, being distinctly higher than that which can be achieved by the use of other known additives.

Thus in one aspect the invention relates to a method of dispersing urea in molten paraffin wax. In another aspect the invention relates to fertilizer compositions which have improved water resistance. Each aspect of the invention will be described in detail separately. The method of dispersing urea in molten paraffin wax will be described first followed by a description of the compositions of the invention.

According to the invention adduction of the urea in a urea-molten paraffin wax mixture is prevented or at least substantially delayed by dissolving in the molten paraffin wax a small amount of certain types of resins. The resins which can be used are damars, copals, East Indias, elemi, and mastic. These specific resins and types of resins are some of the many resins conventionally identified generically as natural resins. Most authorities subdivide natural resins into four subgenera based upon the physical properties of the resins, the trees from which they are obtained, etc. These four subgenera are as follows: damars, East Indias, copals, and miscellaneous. These four groups are further divided into various species. Thus the damars include Batavia damar and Singapore damar and the East Indias include the three species pale, black and batu. The copals are made up of the species Manila, Congo, and kauri, and the miscellaneous subgenus includes a number of species of which sandarac, accroides, elemi, and mastic are examples.

All of the above mentioned natural resins are well known to those skilled in the art. They have been articles of commerce for many years, their principal use being in the varnish industry. Nevertheless these resins will be briefly described.

The damars and East Indias are both resinous exudations of trees of the Dipterocarpaceae family which are indigenous almost exclusively to Malalya and the Dutch East Indies. The damars are mostly obtained from the Hopea and Shorea species of this family while the East Indias are mostly obtained from the Hopea, Shorea, and Vatica species. Both the damars and East Indias have relatively low acid numbers compared to the copals and other resins. There are, however, distinct and well known differences between the damar and East India resins. The damars are recent exudations of the tree and are obtained by tapping the tree. The East India resins, on the other hand, are much older than the damars and are also much harder. The East Indias are actually semi-fossilized damars. They are not obtained by tapping the tree but are collected where found as a result of accidental wounding or normal exudation of the tree. In some instances they are found on the tree or at its base but in other cases they are found in or on the soil, at places to which they have been transported by water such as the banks of rivers, sea or river bottoms, etc. The damar resins and East India resins have different physical properties, the former being softer and having a lower melting point than the latter. In addition, the damars often have a higher acid number than the East Indias. Typical physical properties of the damar and East India resins, and other resins suitable for the present purpose, are shown in Table I below.

As described, there are three species of East India resins, pale, black, and batu. In addition, pale East India resins are also referred to as pale East India Singapore (also known as hiroe) or pale East India Macassar (also known as rasak) to indicate the place from which they have been exported. The batu resins are predominantly yellow, the black East India resins are, as the name indicates, black, and the pale resins are dark red or brown in the case of the Singapore type and reddish-yellow in the case of the Macassar type. The pale resins are soluble in turpentine while the batu and black resins are not.

The names of the damar species, Batavia and Singapore, indicate the port from which the damar has been exported, the port in turn indicating the geographical source of the damar. The physical properties of the two species of damar resins are about the same in most respects.

The copal resins are characterized by generally higher acid numbers than the damar and East India resins. Both Manila and kauri copal resins are produced by the Agathis species of the family of trees Araucariaceae, the Manila resins being found mainly in the Dutch East Indies and the Philippines while kauri is found in New Zealand. The Congo copals are produced by the *Copaifera demeusi* Harms tree in Africa. The Congo and kauri copals are fossilized resins and are very hard. The Manila species of copal resins is subdivided into five subspecies (melengket, loba, Philippine, pointianak, and boea) depending upon the age, hardness, etc. of the resins. Typical properties of the copal resins are also shown in Table I below.

Elemi is produced by a tree indigenous to the Philippine Islands known as *Canarium luzonicum* of the Burseraceae family. It is a very soft resin which has a greenish-white or yellowish-white color and which has typical properties as shown in Table I.

Mastic is a pale yellow or pale green resin produced by the *Pistacia lentiscus,* a tree of the family Anacardiaceae. Most of the resin is obtained in Chios. The resin is relatively soft and typically has properties as shown in Table I.

TABLE I [1]

| | Resin | Softening Point, °F. | Melting Point, °F. | Acid Number |
|---|---|---|---|---|
| 1 | Damar: | | | |
| | Singapore | 148–170 | 230–245 | 15–35 |
| | Batavia | 146–172 | 210–240 | 23–37 |
| 2 | East India: | | | |
| | Pale | 205–270 | 250–335 | 14–35 |
| | Batu | 220–290 | 320–370 | 16–34 |
| | Black | 230–265 | 310–340 | 17–31 |
| 3 | Copal: | | | |
| | Manila | 167–284 | 230–320 | 105–150 |
| | Kauri | 200–285 | 240–330 | 60–80 |
| | Congo | 160–210 | 250–400 | 80–115 |
| 4 | Miscellaneous: | | | |
| | Elemi | ([2]) | ([2]) | 17–37 |
| | Mastic | 120–140 | 160–180 | 58–73 |

[1] Physical properties are determined by the methods stated infra.
[2] Plastic.

East India and most other resins are available commercially in various particle sizes indicated as bold, nubs, chips, and dust. Although the classification is only a rough one, bold refers to particles having a longest dimension greater than about 4 cm. and nubs refers to those having a longest dimension of about 2–4 cm. Dust is about what the term indicates and chips are intermediate between nubs and dust. Generally the amount of impurities increases as the particle size decreases and for this reason bold particles are preferred for the present purpose.

East India and certain other resins available commercially are also traditionally identified as scraped or unscraped. As the resin particles lay on the tree, in or on the ground, in or near water, etc. over the years the surface of the particles deteriorates. Scraped refers to an operation which removes this surface coating of deteriorated resin while the term unscraped indicates that this operation has not occurred. For the present purpose the resin is preferably scraped.

A detailed discussion of the various natural resins is contained in Mantell et al., The Technology of Natural Resins, John Wiley & Sons, Inc. (1942) and in Kirk-Othmer, Encyclopedia of Chemical Technology, pp. 666–679, Interscience Encyclopedia, Inc. (1953).

Any of the natural resins specified above can be used to prevent adduction of a mixture of solid urea and molten paraffin wax. The preferred resins are the damars, the East Indias, and the Manila copals. Of these the East Indias, more preferably East India batu, are preferred. As described, the resin employed is also preferably scraped and bold.

The dispersion of urea in molten paraffin wax can be formed by the method of the invention in any convenient manner. Preferably the paraffin wax is heated to about 225°–250° C. The resin is then added to the wax and the mixture stirred until the resin dissolves in the wax. In some cases, most likely with copal resins, it will be preferable to heat the wax to 300°–350° F. to hasten dissolution of the resin therein. When this is done the wax-resin mixture should subsequently be cooled to about 225°–250° F. to avoid decomposition of the urea upon subsequent addition of same.

It is recognized that the resin may not "dissolve" in the wax in the technical sense of the word dissolve. The wax-resin mixture does, however, have the appearance of a solution in that it is a homogeneous, single phase mixture. Consequently, the resin will be referred to as being dissolved in the wax. It is infrequently found that when a small amount of any of the specified resins are mixed with molten paraffin wax at elevated temperature a portion of the resin remains undissolved in the wax. It is incorrect to identify this residue as resin because if the amount of resin is reduced this undissolved resin still amounts to the same percentage of the original weight of resin. The nature of such residue is not known with certainty but in any event it can be ignored for the present purpose. Where this situation arises, however, this residue is, of course, not considered to be dissolved in the wax. In other words, only that portion of resin which forms a substantially homogeneous phase with the wax is considered dissolved in the wax.

After dissolving the resin in the wax, the urea is then added and the resulting mass is stirred to insure that the urea is uniformly dispersed in the molten wax phase. The dispersion can then be shaped into fertilizer particles in any convenient manner such as by means of a pellet mold, etc. and then cooled.

Alternatively, the urea can be dispersed in the molten wax after which the resin is dissolved in the wax. This procedure has the disadvantage that the urea and molten wax may, and frequently do, react to form the adduct before the resin can be dissolved in the wax. The procedure described above obviates this problem and is therefore the preferred procedure.

The amount of resin used should be sufficient to stabilize the dispersion, i.e., should be sufficient to prevent adduction of the urea or at least postpone the adduction reaction for as long a time as it takes to form the dispersion into fertilizer particles. In most cases a dispersion stable for one hour will be satisfactory since this provides sufficient time for such processing of the dispersion. The amount of resin used to effect stability for at least one hour should be at least 0.1%, preferably at least 1%, more preferably at least 3%, by weight of the paraffin wax. Lower amounts can be used but the dispersion will be stable for a shorter period of time. Amounts as high as 40% by weight of the wax can be used but since it is usually desirable to keep the amount of non-fertilizer ingredients in the final composition as low as possible, the amount of resin is desirably not more than 20% by weight of the wax, preferably not more than 10%.

The method of the invention is applicable to mixtures containing any amounts of urea and molten paraffin wax since any mixture of urea and molten paraffin wax will react to form an adduct at least to some extent. The amount of urea and molten paraffin wax influences the amount of adduct formed, since the adduct has a definite composition of about 76% urea-24% wax, rather than the fact of adduct formation. The relative amounts of urea and molten paraffin wax most frequently present in a mixture of same which is to be ultimately processed into fertilizer particles is discussed more fully hereafter.

In another aspect the invention relates to fertilizer compositions having improved water resistance. I have now found that if an East India resin is incorporated into the wax component, either paraffin or microcrystalline, of a urea-wax slow release fertilizer a distinct improvement in water resistance is obtained. The water resistance is not only distinctly higher than that of a dispersion of urea in wax alone but is also distinctly higher than the water resistance of urea-wax compositions in which materials other than East India resins are dissolved in the wax phase. This is shown more clearly by the data contained in Tables III and IV described infra.

As described previously the East India resins include the species pale, batu, and black. Any of these species can be used to improve the water resistance of a dispersion of urea in wax. Preferably the resin is batu and, more preferably, the resin is scraped and bold.

The compositions of the invention can be prepared in any convenient manner. The preferred method involves heating the wax, either paraffin or microcrystalline, to above its melting point, adding the East India resin, and stirring the mixture until the resin dissolves in the wax. The discussion relating to the use of the term dissolve in connection with the method of the invention is applicable also to the compositions of the invention. The urea is then added and the mass is stirred until the urea is uniformly dispersed in the wax phase. The dispersion of urea in molten wax, the wax having the resin dissolved therein, can then be shaped into fertilizer particles in any convenient manner, such as by means of a pellet mold, etc. and the resulting particles are then allowed to cool until the wax phase solidifies. The resulting particles are a dispersion of solid urea in solid wax, the wax having an East India resin dissolved therein. Each fertilizer particle contains a plurality of urea particles and essentially all of the urea particles are surrounded by and encased in wax, the wax having an East India resin dissolved therein.

The improvement in water resistance obtained by incorporating an East India resin into the wax component of a urea-wax slow release fertilizer is shown by the data contained in Table II. These data show the water resistance of two fertilizer compositions each of which is prepared in the manner described above, the only exception to the above procedure being that in one composition no resin is used. The dispersion of urea in molten wax is formed into particles by means of a mold. The urea used is commercial crystal urea. The final particles of each composition are all essentially the same size. The wax used is a paraffin wax having a melting point of 129° F., a penetration of 18 dmm. at 77° F. and 105 at 100° F., and a viscosity of 38.8 S.U.S. at 210° F. The tests used to determine these properties are described subsequently. The resin used is East India batu. It has a melting point (M.P.) of 340° F., a softening point (S.P.) of 250° F., and an acid number (A.N.) of 20. All resin melting points and softening points stated herein are determined by the procedure described on page 462 of the aforesaid Mantell reference. All acid members are direct acid numbers and are determined by the procedures described on page 466 of the same reference.

The water resistance is shown in Table II as the amount of urea remaining in a fertilizer after the fertilizer is submerged in water at 25° C. without agitation for 72 hours.

TABLE II

| Composition | | Percent Urea Remaining After 72 Hours Under Water |
|---|---|---|
| 1 | 60% Urea, 40% Wax | 10 |
| 2 | 60% Urea, 38% Wax, 2% East India batu | 86 |

It is evident from the data that the incorporation of East India batu into the wax phase has effected a distinct improvement in the water resistance of the fertilizer. Distinct improvements are also obtained when pale or black East India resin is used.

It was mentioned previously that the improvement in water resistance obtained with East India resins is distinctly higher than that which is obtained with the other resins described herein. This is shown by the data contained in Table III which shows the water resistance of various urea-wax-resin compositions all which contain 60% urea, 38% wax, and 2% of the resin stated. The water resistance of Composition 1 of Table II is included in Table III for ready comparison. The urea and wax are of the same type used in preparing the compositions of Table II and the compositions are made in the same manner as those of Table II. The resins used have the following physical properties:

| | M.P., ° F. | S.P., ° F. | A.N. |
|---|---|---|---|
| Singapore damar | 240 | 155 | 17 |
| Elemi | | | 26 |
| Manila loba copal | 239 | 180 | 145 |
| Congo copal | 260 | 190 | 101 |
| Mastic | 169 | 130 | 68 |

TABLE III

Percent urea remaining after
Resin used:                72 hours under water
 (1) None _____ 20
 (2) East India batu _____ 86
 (3) Singapore damar _____ 15
 (4) Elemi _____ 20
 (5) Manila loba copal _____ 27
 (6) Congo copal _____ 22
 (7) Mastic _____ 30

It is apparent from the data contained in Table III that the East India resin effects a much greater improvement in water resistance than the other resins.

It was mentioned previously that East India resin effect a greater improvement in water resistance than other known additives. For example, in a copending application of Bozzelli et al., Serial No. 308,251, filed September 11, 1963 it is disclosed that various types of rosin, both modified and unmodified, can be used to improve the water resistance of a urea-wax slow release fertilizer. It is also disclosed therein that of the many different types of rosin suitable for this purpose the maximum improvement in water resistance is obtained when the rosin employed is polymerized wood rosin or the calcium salt thereof containing 7–10% calcium as Ca which has been partially oxidized by heating at, say, 140° F. in an atmosphere of air for, say, 3 days. The improvement effected by using these two rosins is distinctly higher than that obtained when other rosin are employed.

The compositions of the present invention, containing East India resin, have substantially the same water resistance as compositions containing partially oxidized rosin as described above. In other words, East India resins have substantially the same effectiveness as the partially oxidized rosins mentioned above, the latter being themselves distinctly more effective than other types of rosin. The East India resins do not, of course, have to be partially oxidized. The data contained in Table IV show the water resistance of urea-wax compositions containing East India batu in one case and partially oxidized (3 days at 140° F.) polymerized wood rosin in the other case. The compositions are made in the same manner as those in Table III.

TABLE IV

Percent urea remaining after
Composition:                72 hours under water
 (1) 60% urea-40% wax _____ 20
 (2) 60% urea-38% wax-2% East India batu __ 86
 (3) 60% urea-38% wax-2% partially oxidized
      polymerized wood rosin _____ 91

It is evident from the data contained in Table IV that both additives have approximately the same ability to improve the water resistance of the composition, the East India batu effecting a 330% improvement and the rosin effecting a 355% improvement.

Any kind of paraffin or microcrystalline wax can be used in the compositions of the invention. Preferred paraffin and microcrystalline waxes are described in more detail subsequently. As between these two types of waxes, paraffin wax is preferred.

The amount of East India resin used should be at least 0.5% by weight of the wax, preferably at least 1%, more preferably at least 2%. Amounts as high as 40% can be used but preferably the amount is not higher than 20%, more preferably 10%, in order to keep the non-fertilizer ingredients in the composition at a minimum.

The terms paraffin wax and microcrystalline wax are used herein in accordance with their conventional meanings. Both types of waxes are obtained only from petroleum, and since they are the only waxes obtainable from petroleum, they are referred to generically as petroleum wax. Their differences and similarities are well known to those skilled in the art and are summarized in Bennett, Commercial waxes, Chemical Publishing Co., (1950), pp. 84–88. Both paraffin and microcrystalline waxes contain mainly saturated paraffin hydrocarbons, the former containing mainly straight chain paraffins while the latter contains a substantial amount of branch chain paraffins. Some typical properties of paraffin and microcrystalline waxes are shown in Table V below.

TABLE V

| Property | Paraffin Wax | Microcrystalline Wax |
|---|---|---|
| Molecular Weight | 250–500 | 500–800. |
| Melting Point (ASTM D-127) | 110–165° F | 140–210° F. |
| Viscosity at 210° F. (ASTM D-446) | 30–50 S.U.S | 60–100 S.U.S. |
| Penetration at 77° F. (ASTM D-1321, 100 g., 5 sec.). | 5–25 dmm | 5–25 dmm. |

It is apparent from the data in Table V that some of the physical properties of the paraffin waxes overlap the normal range of the same property in the microcrystalline waxes. The property which can be used, as is well known, to distinguish paraffin wax from microcrystalline wax is the type of crystals present in each. Paraffin wax has large well-formed crystals while mircocrystalline wax contains small irregular crystals and no well-formed crystals of any size. Indeed, microcrystalline wax is sometimes referred to as amorphous. In the method aspect of the invention it is preferred that the paraffin wax have a melting point, viscosity, and penetration within the appropriate ranges specified in Table V. With respect to the compositions of the invention it is preferred that both the paraffin and microcrystalline waxes have a melting point, viscosity, and penetration within the appropriate ranges shown in Table V. All wax properties specified elsewhere in this specification are determined by the appropriate test indicated in Table V.

It was mentioned previously that adduction of any mixture of solid urea and molten paraffin wax can be prevented by the method of the invention. As described, the relative amounts of urea and wax in such mixture is not critical, i.e., adduction will occur to some extent regardless of the amounts of urea and wax present. Similarly, the amount of urea and wax in the compositions of the invention can vary widely, for the dispersion of urea in any amount of wax is effective to improve the water resistance of the urea to some degree. For any amounts of urea and wax the water resistance of the resulting slow release fertilizer can be distinctly improved over that obtained with wax alone by incorporating an East India resin in the wax.

In most cases, however, the amount of urea and wax in the compositions of the invention will be within certain ranges depending upon whether the fertilizer is a nitrogen fertilizer or a complete fertilizer and depending upon soil and climatic conditions at the location of actual use. The use of a nitrogen fertilizer or a complete fertilizer depends mainly upon soil conditions. In some cases only nitrogen is needed; hence only a nitrogen fertilizer is applied. A slow release nitrogen fertilizer containing urea as the source of nitrogen will normally contain, based on the total composition weight, a major amount of urea, usually 50–80%, more frequently 50–70%. The amount of wax phase, i.e., the total amount of wax and resin, will normally be, based on the total composition weight, a minor amount, usually 15–49%, more frequently 25–49%.

In most cases soil conditions will dictate the use of a fertilizer containing a plurality of essential elements such as a complete fertilizer. In such a case the total amount of fertilizer ingredients and the amount of wax phase will still normally be a major amount and minor amount respectively, usually 50–80%, and 15–49% respectively, more frequently 50–70% and 25–49% respectively, but the actual amount of urea may be relatively small. For example, a 10-10-10 complete slow release fertilizer, i.e., a fertilizer containing 10% nitrogen as N, 10% phosphorus as $P_2O_5$, and 10% potassium as $K_2O$, might contain the following:

| | Percent |
|---|---|
| Urea | 21.4 |
| Triple superphosphate | 21.7 |
| Potassium chloride | 16.7 |
| Wax | 40.2 |
| | 100.0 |

A 5-15-10 (5% nitrogen, 15% phosphorus, and 10% potassium) complete slow release fertilizer might contain

| | Percent |
|---|---|
| Urea | 10.6 |
| Triple superphosphate | 32.6 |
| Potassium sulfate | 18.5 |
| Wax | 38.3 |
| | 100.0 |

In most cases the amount of urea in a complete slow release fertilizer will not be less than 5% nor more than 50% and will usually be at least 10%, more frequently at least 20%. Therefore, considering both the slow release complete fertilizer and the slow release nitrogen fertilizer, the amount of urea will usually be 5–80 parts urea and the amount of wax phase will be 15–49 parts. This also means that the method of the invention, i.e., the method of forming a stable dispersion of urea in molten paraffin, will usually be applicable to a dispersion of urea in molten paraffin wax containing 5–80 parts urea and 15–49 parts wax phase, more frequently 20–70 parts and 25–49 parts respectively.

The following examples illustrate more specifically the formation of a stable dispersion of urea in molten paraffin wax according to the method of the invention. Examples specifically illustrating the practice of the invention with respect to the inventive compositions have been presented in Tables II–IV and the discussion relating thereto.

The procedure is substantially the same in each example. 38 parts of a paraffin wax having properties as stated in conjunction with the compositions of Table I are heated to 225° F. Next 2.0 parts of the specified resin (5% by weight of wax) is added to the wax with stirring. After the additive has dissolved in the wax 60 parts of crystal urea are added. The mass is stirred and the time at which adduction occurs is noted. If adduction does not occur for 1 hour the experiment is ended. The examples below show the specific resins used and the adduction time obtained for each. The statement that adduction does not occur means that adduction has not occurred after one hour at which point the experiment is ended. The only exceptions to the above procedure arise in Example I in which no resin is employed.

*Example I*

No additive is used. Within 5 minutes the entire mass becomes solid. Analysis of the solid shows that it contains a substantial amount of a urea-paraffin wax adduct.

*Example II*

The resin used is Singapore damar. Adduction does not occur.

*Example III*

The resin used is elemi. Adduction does not occur.

*Example IV*

The resin used is Manila loba copal. Adduction does not occur.

*Example V*

The resin used is East India baut. Adduction does not occur.

*Example VI*

The resin used is Congo copal. Adduction does not occur.

*Example VII*

The resin used is mastic. Adduction does not occur.

The invention claimed is:

1. A slow release fertilizer composition which comprises a dispersion of solid urea in solid petroleum wax, said wax having dissolved therein an East India resin selected from the group consisting of pale, batu, and black, said dispersion being characterized in that substantially all the particles of said solid urea in said dispersion are surrounded by and completely encased in said petroleum wax, the amount of said East India resin being 0.5–40% by weight of said petroleum wax.

2. Composition according to claim 1 wherein the amount of said solid urea is 5–80 parts and the total amount of said petroleum wax and said East India resin is 15–49 parts.

3. Composition according to claim 2 wherein said petroleum wax is paraffin wax.

4. Composition according to claim 2 wherein the amount of said East India resin is 2–20% by weight of said petroleum wax.

5. Composition according to claim 2 wherein said East India resin is East India batu.

6. Composition according to claim 2 wherein the amount of said solid urea is 20–70 parts and the total amount of said petroleum wax and said East India resin is 25–49 parts.

7. Method of forming a slow release fertilizer comprising a dispersion of solid urea in a solid paraffin wax which when in molten state normally reacts with solid urea to form a urea-paraffin wax adduct which comprises (1) heating said paraffin wax to above its melting point whereby molten paraffin wax normally susceptible to adduction is obtained, (2) dissolving in said molten paraffin wax as an adduct inhibitor 0.5–40%, by weight of said molten paraffin wax, of a resin selected from the group consisting of damars, East Indias, copals, elemi, and mastic, (3) dispersing solid urea in the molten paraffin wax containing said adduct inhibitor dissolved therein, and (4) cooling the resulting dispersion to below the melting point of said paraffin wax, whereby a slow release fertilizer comprising a dispersion of solid urea in solid paraffin wax is obtained.

8. Method according to claim 7 wherein the amount of said solid urea is 5–80 parts and the total amount of said molten paraffin wax and said resin is 15–49 parts.

9. Method according to claim 8 wherein said East India resin is East India batu.

10. In a process in which solid urea is dispersed in a molten paraffin wax which normally reacts with said solid urea to form an adduct and the resulting mixture is subsequently cooled to below the melting point of said wax whereby a solid slow release fertilizer is obtained the improvement for inhibiting reaction between said solid urea and said molten paraffin wax to form an adduct which comprises dissolving in said molten paraffin wax a resin selected from the group consisting of damars, East Indias, copals, elemi, and mastic, the amount of said resin being 0.5–40% by weight of said wax.

11. A process according to claim 10 wherein the amount of said resin is at least 3% by weight of said wax.

References Cited by the Examiner

UNITED STATES PATENTS

| | | | |
|---|---|---|---|
| 2,936,226 | 5/1960 | Kaufman et al. | 71—64 |
| 3,014,783 | 12/1961 | Young | 71—64 |

OTHER REFERENCES

Varnish Constituents, Chatfield, Interscience Publishers, Inc., N.Y., 1944 (note pages 60–74 specifically).

DONALL H. SYLVESTER, *Primary Examiner.*

ANTHONY SCIAMANNA, *Examiner.*

T. D. KILEY, *Assistant Examiner.*